United States Patent [19]
Boss et al.

[11] 3,987,702
[45] Oct. 26, 1976

[54] METHOD AND DEVICE FOR ELECTROHYDRAULIC CONTROL OF A HYDRAULIC ACTUATOR

[75] Inventors: Holm Diethard Boss; Hans Albert Butschek, both of Munich, Germany

[73] Assignee: Messerschmitt-Bolkow-Blohm GmbH, Munich, Germany

[22] Filed: July 19, 1974

[21] Appl. No.: 490,132

Related U.S. Application Data

[62] Division of Ser. No. 173,525, Aug. 20, 1971, Pat. No. 3,834,279.

[30] Foreign Application Priority Data
Aug. 21, 1970 Germany............................ 2041681

[52] U.S. Cl............................................ 91/1; 91/3; 91/459; 91/461; 91/471
[51] Int. Cl.².................. F01B 25/26; F15B 13/042
[58] Field of Search ............. 91/3, 363 A, 448, 459, 91/471, 453, 367, 461, 1; 137/625.6, 625.63, 625.64, 557

[56] References Cited
UNITED STATES PATENTS

| | | | |
|---|---|---|---|
| 3,237,634 | 3/1966 | Colby, Jr. .................. | 137/557 X |
| 3,265,089 | 8/1966 | Nill ............................ | 137/625.64 X |
| 3,391,611 | 7/1968 | Jenney ........................ | 91/459 |
| 3,496,836 | 4/1970 | Jenney ........................ | 91/448 X |
| 3,556,154 | 1/1971 | Kramer ...................... | 137/625.64 |
| 3,667,344 | 6/1972 | Westbury et al. ........... | 91/1 |
| 3,739,689 | 6/1973 | Craven ........................ | 91/3 |

Primary Examiner—Irwin C. Cohen
Attorney, Agent, or Firm—Woodhams, Blanchard and Flynn

[57] ABSTRACT

Method and apparatus for the electric hydraulic control of a hydraulic actuator, said control comprising a redundant servovalve circuit with switching and monitoring logic. The apparatus has a plurality of electrohydraulic servovalves each controlled by separate electrical input channels and connected to a central pressure medium source. The control further has a control spool triggered by the servovalve to control the actuator and a hydraulic logic system for monitoring errors in the servo output signal. The positioning land of the control spool is acted upon on the one side by one group of signals consisting of the combined output signals of the same sign from one selected group of servovalves and is acted upon on the other side by the central pressure medium supply while the remaining sevovalve signals are applied separately to a hydraulic logic system including a comparator and alarm means.

2 Claims, 17 Drawing Figures

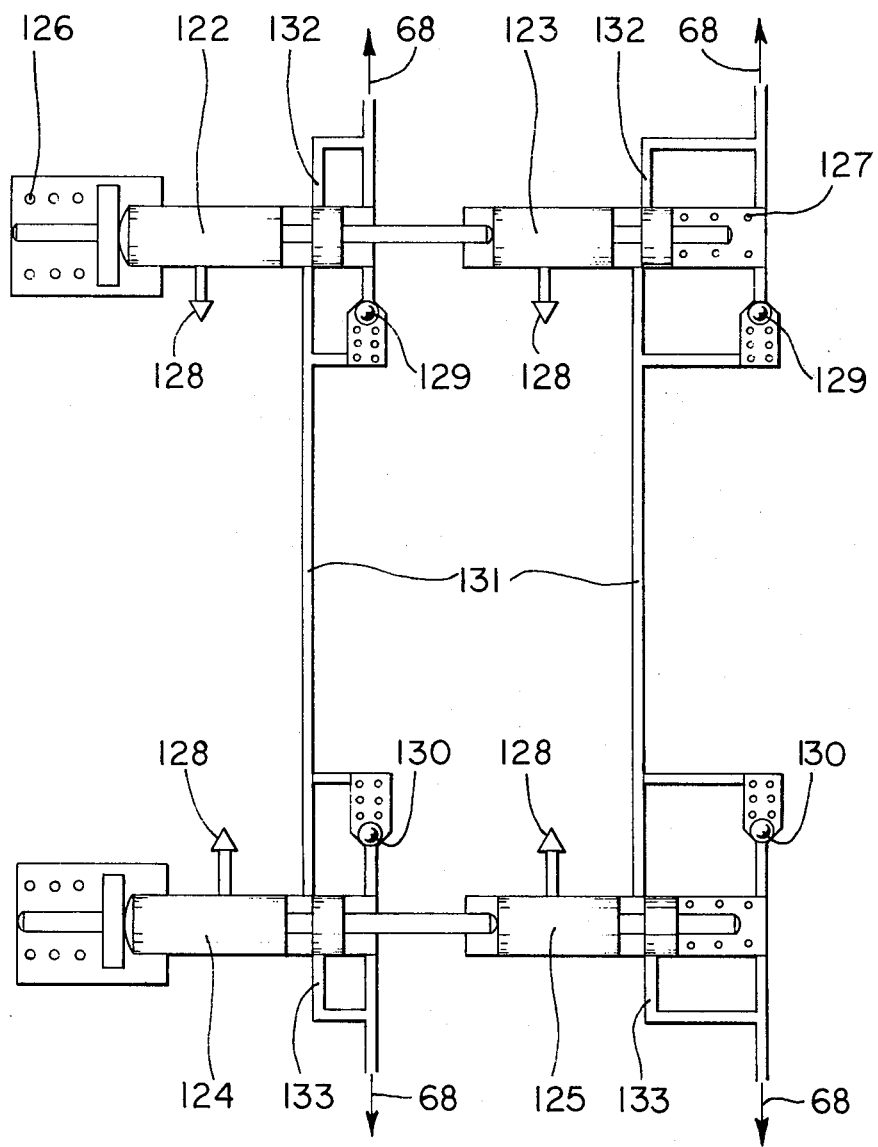

METHOD AND DEVICE FOR ELECTROHYDRAULIC CONTROL OF A HYDRAULIC ACTUATOR

This is a division of application Ser. No. 173,525, filed Aug. 20, 1971, now U.S. Pat. No. 3,834,279.

FIELD OF THE INVENTION

The invention relates to a method and a device for the electrohydraulic control of a hydraulic actuator in the form of a redundant servovalve circuit with switching and monitoring logic, having a multiplicity of electrohydraulic servovalves, each controlled by separate electrical input channels and connected to a central pressure medium source, and having further a control spool triggered by the servovalves to control the actuator and a hydraulic logic system for error monitoring of the servovalve output signals.

BACKGROUND OF THE INVENTION

In modern redundant hydraulic control systems there is frequently a requirement that any errors arising be indicated, and that if a certain number of errors occurs, a switching logic associated with the control system perform special safety switching operations, for example, deactivation of the system or return of the actuator to a neutral position.

For monitoring redundant electrohydraulic actuators, two types of hydromechanical circuits are used at the pressure ports of the servovalves (electrohydraulic servovalves and electrohydraulic amplifiers):

a. Redundant servovalve circuits. The servovalve pressure ports are arranged in such a way as to permit control of the actuator and the detection of errors by comparison of the pressures through use of a comparator. If the pressure difference between two servovalves exceeds a prescribed value, the comparator initiates a reaction in the switching and monitoring logic.

b. Switching and monitoring logic (hydrologic). Following initiation by the comparator, the pressure medium supply for servovalves is irreversibly deactivated by the hydrologic. The irreversibility of the servovalve deactivation represents an error storage. By means of a solenoid valve, the pressure medium for the servovalves can again be activated, if, at the instance of the activation command, no new deactivation is triggered by the comparator due to a possible pressure differential existing between the servovalves. An additional solenoid valve circuit permits cutoff of the pressure medium supply for the servovalves by an electrical signal, without release by the comparator.

It has already been proposed that the ports of the control spool, which are connected to the outlets of the electrohydraulic servovalves, be associated in a certain manner with a hydrologic system, which detects the error and, for its part, triggers indicators and/or switches. In this previously used system, there must be a separate port for each outlet to each servovalve, i.e., a quantity of positioning lobes equal to the number of servovalves. This leads to inconvenient dimensions, increased manufacturing effort and increased susceptibility to errors attributable to the control spool.

It is therefore the object of the present invention to provide a method and a device of the type mentioned above which permit simpler construction of the control spool, without having to compromise its functioning, especially the possibility of evaluation in a hydrologic system.

The invention attains this objective by employing a method in which the positioning land of the control spool is acted upon, on the one side, by the one signal group consisting of the combined servovalve output signals of the same sign and, on the opposite side, by the central pressure media supply, while the remaining free servovalve signals are applied individually to the hydrologic system.

The summation of all output signals, always essential in a "majority voting system", no longer takes place, in the case of the proposed device mentioned above, such that the forces produced by the individual pressures and the associated land areas are added, the resultant force depending upon the difference between the output signals of opposite sign. Instead, in the case of the present invention, the signal group consisting of all output signals of the same sign is combined and their combined pressure is compared with the constant pressure in the central pressure media supply. The free remaining output signals of the opposite sign therefore are left over for a further processing in the hydrologic system. The invention therefore exploits the fact that both output signals of a servovalve always change with respect to one another, so that a qualitative and quantitative indication as to the condition of the servovalve can also be obtained by comparing one output signal to a constant valve.

To realize the method outlined in the invention, a device is provided having a multiplicity of electrohydraulic servovalves, a control spool triggered by the servovalves to control a hydraulic actuator and a hydrologic system wherein the one group of all servovalve outputs of the same sign is conducted to one side of the positioning land of the control spool, and the other group of outputs is connected separately to the hydrologic system and, further, wherein, the other side of the control spool positioning land is connected with the central pressure medium source.

One illustrative embodiment of the invention provides, as servovalves, two single stage jet-pipe valves attached to a central pressure medium source, further, a control spool having one positioning land, two control lands and an attached comparator responding from two sides, said comparator having a switching device to shut off the central pressure medium supply, each of the two jet-pipe valve outputs of the same sign jointly acting upon one side of the positioning land, the central pressure medium supply acting upon the other side of the positioning land, and the two other outputs of the jet-pipe valves acting upon both sides of the comparator, the displacement of which triggers the switching device.

The positioning land mentioned in the present description can readily be divided into two individual lands, in which case, only one side of each land is acted upon for the purpose of displacing the control spool.

Another illustrative embodiment of the invention provides that two such devices be connected in parallel to a common pressure medium supply, in which case, both control spools are rigidly, mechanically connected to each other and the output signals trigger the switching devices indirectly via an AND-gate and a further switch for cutting in a safety device or to cut out the central pressure medium supply. A circuit of this kind still permits control of the control valve even after the shutoff of two servovalves by one of the switching devices.

In still another illustrative embodiment of the invention, three electrohydraulic servovalves are provided whose two free outputs not used to trigger the common control spool, trigger a system of three hydraulic comparators whose outputs are connected via a triple AND-gate to a switch for cutting off the central pressure medium supply or to any other safety circuit. A circuit of this kind can survive the failure of one servovalve. Not until failure of a further servovalve do all three comparators deflect and activate, via the AND-gate, the switch for any safety circuit.

BRIEF DESCRIPTION OF THE DRAWINGS

Several illustrative embodiments of the invention are shown in the drawings and will be more closely described hereinafter.

Shown are:

Figure 1:
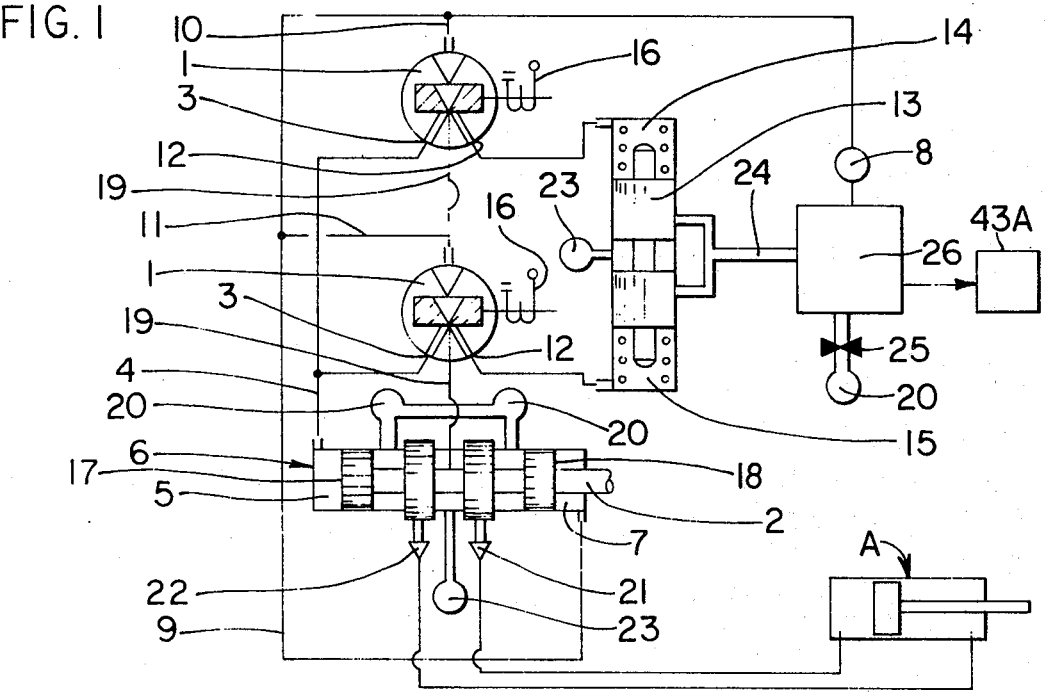
Figure 2:
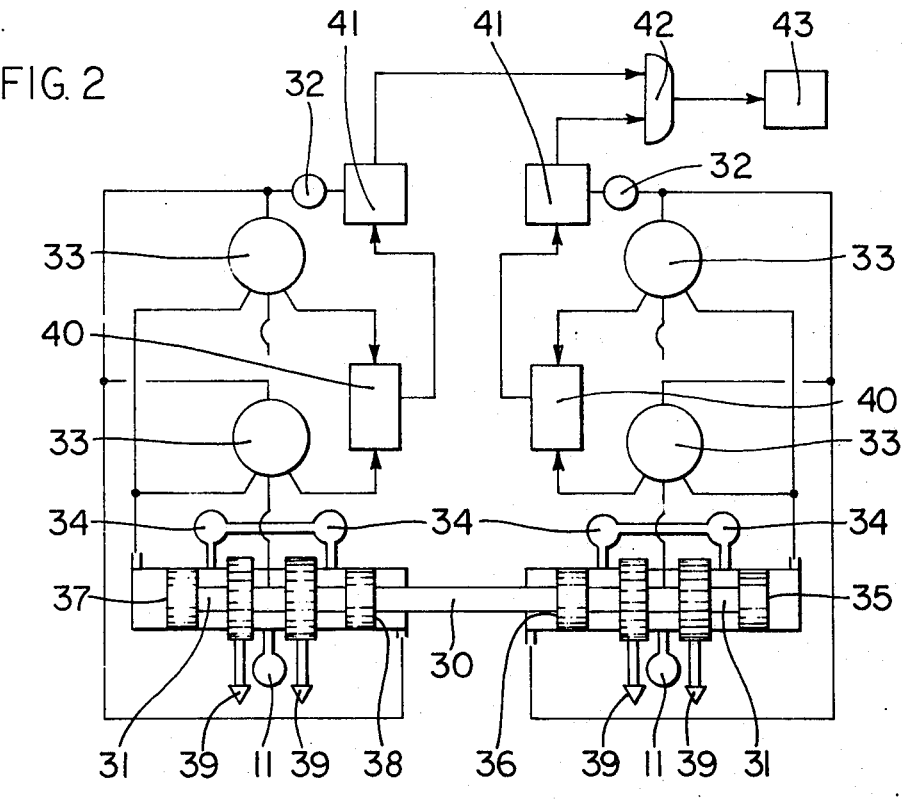

| FIG. | | |
|---|---|---|
| FIG. | 1 | An electrohydraulic actuator with two servovalves acting upon one control spool; |
| FIG. | 2 | two systems according to FIG. 1 connected in parallel; |
| FIG. | 3 | An electrohydraulic actuator with three servovalves acting upon one control spool; |
| FIGS. | 4-16 | special switching logic designs as are usable in the devices shown in FIGS. 1 and 2 |
| FIG. | 17 | a redundant version of an AND gate. |

DETAILED DESCRIPTION

The electrohydraulic servovalve shown schematically in FIG. 1, especially in the form of a jet-pipe valve 1, controls a control spool 2, which in turn triggers a hydraulic actuator A. The two servovalve pressure ports 3 of the same signal are joined to a common line 4 which is connected to chamber 5 in control spool housing 6. Chamber 7 in control spool 6 connects, through line 9, with the central pressure medium supply 8, which also supplies both servovalves through lines 10 and 11.

When both solenoid devices 16 in the servovalves are de-energized, the force acting upon the positioning land area 17 is equal to the force acting upon the opposite positioning land area 18 and control spool 2 is in equilibrium. The control spool assumes its central position by means of springs 19, which connect the control spool with the solenoid devices 16. When solenoid devices 16 are activated, the pressure in the pressure ports 3 changes, due to appropriate deflection of the servovalves. This leads to a sliding of the control spool, a pressure decrease in line 4 causing a slide to the left, and an increase in line 4 causing a slide to the right. If, for example, the control spool is slid to the left, it opens the connection from pressure port 20 of the working medium to the control port 21, and, simultaneously, from pressure port 22 to return port or drain 23, which leads to a corresponding movement of the actuator.

Both servovalve pressure ports 12 are compared with each other by a comparator 13. When both servovalves do not produce the same pressure, the comparator 13 then deflects and connects lines 20 and 23 through orifice 25. Lines 20 and 23 represent the pressure potential between the pressure medium inflow and drain. When lines 20 and 23 are connected with each other, the pressure in line 24 changes, thus causing a response in switching logic 26. This serves to trigger a safety circuit 43A, to energize a warning alarm device or to shut off the central pressure supply 8. In this way, an error at the pressure port of both servovalves can be detected and eliminated.

In FIG. 2, two control channels, each in accordance with the device shown in FIG. 1, are connected in parallel. The two control spools 31 are coupled together by a connecting rod 30. Both channels are connected to the same pressure medium supply 32 for the servovalves 33, and to the same working medium supply 34. When the circuit is functioning properly, both control spools 31 are balanced, i.e., the forces acting upon the positioning land surfaces 35 and 36 cancel each other out, the same as do the forces acting on the positioning land areas 37 and 38. The actuator ports of control spool 31 work upon a hydraulic actuator, likewise redundant, but not shown in the drawing. Each of the two comparators 40 associated with the signal channels triggers, for its part, a switching logic 41 to shut off the central pressure medium supply 32. If, for example, due to an error in one of the servovalves, the pressure medium supply 32 for one channel is shut off. The two other servovalves must then, by themselves, move control spools 31, which are connected to each other by connecting rod 30. The pressure medium inlet 34 for the working medium is not cut off by the switching logic 41, so that following deactivation of one channel, both control spools 31 still furnish pressure medium for the hydraulic actuator.

When both switching logic units 41 deactivate the associated signal channels, switch 43B is tripped by AND-gate 42 for some kind of safety switching operation (for example, shutting off the actuator controlled by control spool 31). The circuit shown in FIG. 2, with redundant pressure medium input, can survive the failure of one servovalve or one pressure medium input.

Figure 3:
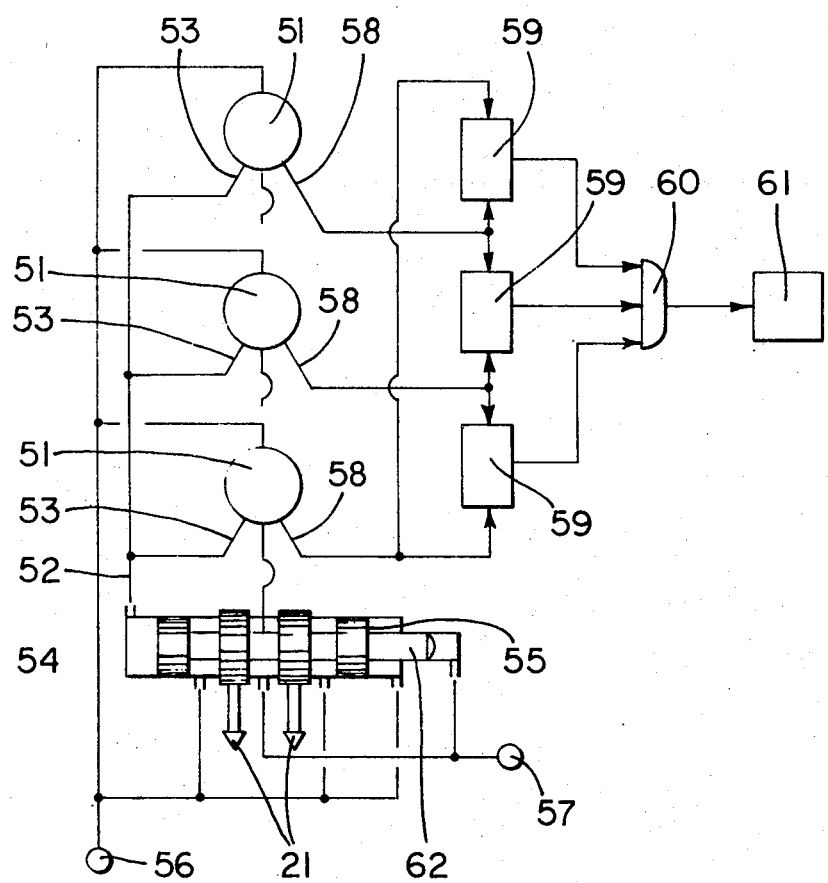

FIG. 3 displays the use of the principle of the circuit of FIG. 1 as applied to three servovalves 51. The outlet ports 53 of the same sign work through common line 52 upon one positioning land 54 of control spool 62, while the other positioning land is acted upon by the pressure medium supply 56. The drain, or return line, is indicated by 57.

Pressure ports 58 of the three servovalves are compared with each other by comparators 59. When a servovalve 51, for example the uppermost one shown in FIG. 3, has one port with a spurious pressure, two of the three comparators are deflected. In the example cited, the upper comparator would be deflected upwards and the center comparator downwards. This condition does not yet result in transmission of the error signal in AND-gate 60. Not until two spurious servovalve output signals are produced do all three comparators deflect, thus triggering switch 61 via AND-gate 60 for any desired safety switching operation. The circuit shown in FIG. 3 can survive the failure of one servovalve.

The circuit represented in FIG. 3 can be doubled in accordance with FIG. 2, thus forming a circuit with six servovalves.

Switching logics for feasible duplex and duo-duplex servovalve circuits will now be described.

The switching logics outlined hereinafter are embodiments, the general function of which is the same as that in 26, shown in FIG. 1, and 41, shown in FIG. 2.

The circuits vary from each other in the arrangement and number of solenoid valves and in having parallel or series connection of switching logic 41 with AND-gate 42 in the case of the duo-duplex circuit. A distinction is made between active and passive solenoid valves. Active solenoid valves can shut off the pressure medium supply to the servovalves. Passive solenoid valves are capable only of restoring the pressure medium supply to the servovalves. Switching logic 41 and AND-gate 42 lie in parallel when the AND element is connected to line 24 and simultaneously respond to the switching logic controlled by line 24. Switching logic 41 and AND element 42 lie in series when the AND element is not connected to line 24 and is first triggered by the switching logic.

The switching logics are connected to the pressure medium inlet 65 and drain 66. Three connections are provided for the switching function; line 67 leads to comparator 13 (FIG. 1) or 40 (FIG. 2), line 68 to a switch 43A (FIG. 1) or to AND element 42 (FIG. 2) and the servovalves are supplied with pressure medium from line 69.

Figure 4:
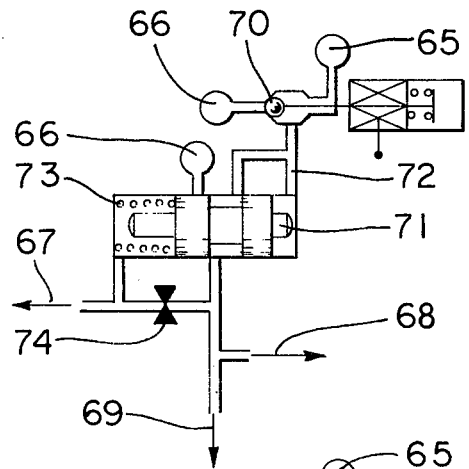
Figure 5:
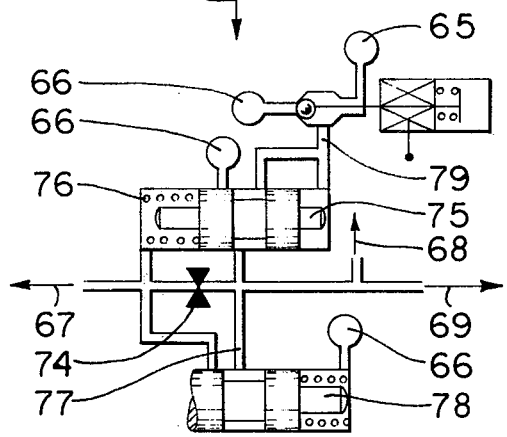

FIGS. 4 and 5 show a switching logic with an active solenoid valve 70 in the inlet and connected in series to the AND element 42 or switch 43A. The active solenoid valve 70 has two switching states; in the excited state, it opens the connection to the pressure medium drain 66. When the servovalves are operating, solenoid valve 70 is excited and spool 71 (which acts as a further comparator) is in the extreme right-hand position, thus connecting outlets 67, 68 and 69 with pressure medium inlet 65. In order to describe the function of the switching logic in FIG. 4, switching off by the comparator 13 connected to line 67, and switching off and on of active solenoid valve 70 will now be described.

a. Switching off by the comparator.

When the comparator 13 deflects, the pressure in line 67 breaks down and spool 71 is slid to the left-hand end position by the pressure medium flowing from inlet 65. Orifice 74 prevents, during this operation, the occurrence of a short circuit between the pressure inlet and drain. When in the left-hand end position, spool 71 connects outlet 67, 68 and 69 with pressure medium drain 66, the functioning of the servovalves is irreversibly stopped due to the connection with the pressure medium drain 66, and there is no flow through orifice 74.

b. Shutoff by the active solenoid valve.

When the comparator does not deflect and energization of the active solenoid valve 70 is continuously shut off, outlets 67, 68 and 69 are then connected to pressure medium drain 66 and the functioning of the servovalves is stopped. During this shutoff operation, the spool remains in the right-hand end position.

c. Switching on by the active solenoid valve.

Cancellation of servovalve functioning can be initiated by the comparators or by the active solenoid valve 70. In the case of shutoff by the active solenoid valve 70, functioning of the servovalves is restored through excitation of solenoid valve 70. In the case of shutoff by the comparator, servovalve functioning is restored by brief interruption in the energization of solenoid valve 70. During the brief interruption of excitation, line 72 is connected with pressure medium drain 66 and spring 73 moves spool 71 into the right-hand end position. When solenoid valve 70 is subsequently subjected to continuous energization, lines 67, 68 and 69 are again connected with pressure medium inlet 65 and servovalve functioning is restored. Further excitation of solenoid valve 70 in FIG. 4 results in pressure in line 67 and, due to the elasticity and/or the compressibility of the pressure medium, volume is consumed, which flows through orifice 74.

To prevent the pressure differential thus arising between lines 72 and 67 from sliding the spool 71 into the left-hand end position again, the overlapping travel of spool 71 multiplied by its cross sectional area must be the same as the volume flowing through orifice 74. In addition, spring 73 is prestressed so that spool 71 cannot be slid into the left-hand end position until a certain pressure differential between lines 72 and 67 has been exceeded.

It has been assumed in FIG. 5 that the volume flowing through orifice 74, caused by the pressure in line 67, is high enough so that the overlapping of spool 75 and the prestressing of spring 76 would not be sufficient to maintain spool 75 in the right-hand end position. For this reason, an additional bypass is provided by means of line 77 and one control end of AND-gate 78 to bypass orifice 74. In the normal case, when the servovalves are functioning, AND-gate 78 is held in the right-hand end position by the pressure medium originating at 65 and existing in line 68, and the bypass is blocked. If lines 67 and 68 are placed under pressure, AND-gate 78 is in the left-hand end position and the bypass is open, so that the pressure medium volume can flow into line 61 by bypassing orifice 74 and no pressure differential can occur between lines 79 and 67 that could slide spool 75 into the left-hand end position. When line 67 to the comparator and line 68 to the AND-gate are filled, AND-gate 78 is in the right-hand end position and the bypass is again blocked. Spool 71 and 75 can be brought into the right-hand end position by brief interruption in the excitation of solenoid valve 70, only when the varying pressures at the servovalve outlets, which caused deflection of the comparator, have again become uniform. Otherwise, line 67, downstream from restrictor orifice 74, does not fill.

Figure 6:
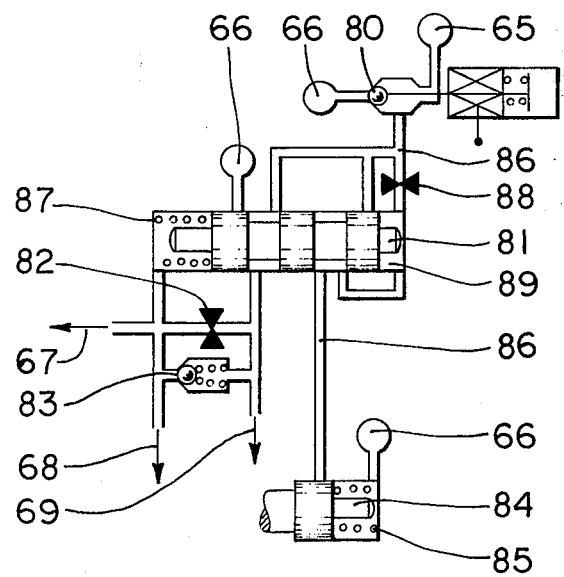

FIG. 6 shows a switching logic with an active solenoid valve in the inlet and parallel connection to the AND-gate. Active solenoid valve 80 has two switching states; in the energized state, it opens the connection to the pressure medium inlet 65 and in the de-energized state, it opens the connection to the pressure medium drain 66. When the servovalves are operating, solenoid valve 80 is excited and spool 81 is in the right-hand end position and connects outlets 67, 68 and 69 with pressure medium inlet 65. To describe the function of the switching logic in FIG. 6, switching off by the comparator through line 67 and switching on and off by the active solenoid valve 80 will now be considered.

a. Switching off by the comparator

When the comparator deflects, the pressure in line 67 breaks down and spool 81 is slid by the pressure medium entering at 65, at first, through restrictor orifice 88, then bypassing restrictor orifice 88, into the left-hand end position. Orifice 82 prevents, during this operation, a short circuit between the pressure medium inlet and drain. When in the left-hand end position, spool 81 connects outlets 67, 68 and 69 with pressure medium drain 66, functioning of the servovalves is irreversibly stopped due to connection with pressure medium drain 66, and there is no flow through orifice 82.

b. Switching off by the active solenoid valve

When the comparator does not deflect and energization of the active solenoid valve 80 is continuously switched off, outlets 67, 68 and 69 are connected to the pressure medium drain 66 and the functioning of the servovalves is canceled. When lines 67 and 68 are connected to the pressure medium drain 66, AND-gate 84 moves to the left-hand end position by means of spring 85 and line 86 is connected to pressure medium drain 66. The volume displaced by AND-gate 84 during the movement into the left-hand end position flows through the opened check valve 83 into pressure medium drain 66.

c. Switching on by the active solenoid valve

Cancellation of servovalve functioning can be initiated by the comparator or by active solenoid valve 80. If the switching off is effected by active solenoid valve 80, the functioning of the servovalves is restored by excitation of solenoid valve 80. If switching off is accomplished by the comparator, the functioning of the servovalves is restored by a brief interruption of energization of solenoid valve 80. During the brief interruption of excitation, line 86 is connected with pressure medium drain 66 and spring 87 moves spool 81 into the right-hand end position. Upon subsequent continuous energization of solenoid valve 80, lines 67, 68 and 69 are again connected to pressure medium inlet 65 and functioning of the servovalves is restored. Upon further excitation of solenoid valve 80, lines 67 and 68 are placed under pressure and, due to the elasticity and/or the compressibility of the pressure medium and the movement of AND-gate 85 into the right-hand end position, volume is displaced which flows through orifice 82.

As long as the lines 67 and 68 are not full, no pressure can build up in space 89 that could push spool 81 into the left-hand end position, due to the action of orifice 88. When lines 67 and 68 are filled, AND-gate 84 is in the right-hand end position, the connection between line 86 and pressure medium drain 66 is closed and the pressure needed for switching off is built up in space 89 and is effective to move spool 81 into the left-hand end position.

Spool 81 can be brought into the right-hand end position by brief interruption in the energization of solenoid valve 80, only when the varying pressures at the servovalve outlets, which caused the deflection of the comparator, have again become uniform. Otherwise, lines 67 and 68, downstream from restrictor orifice 82, will not fill.

Figure 7:
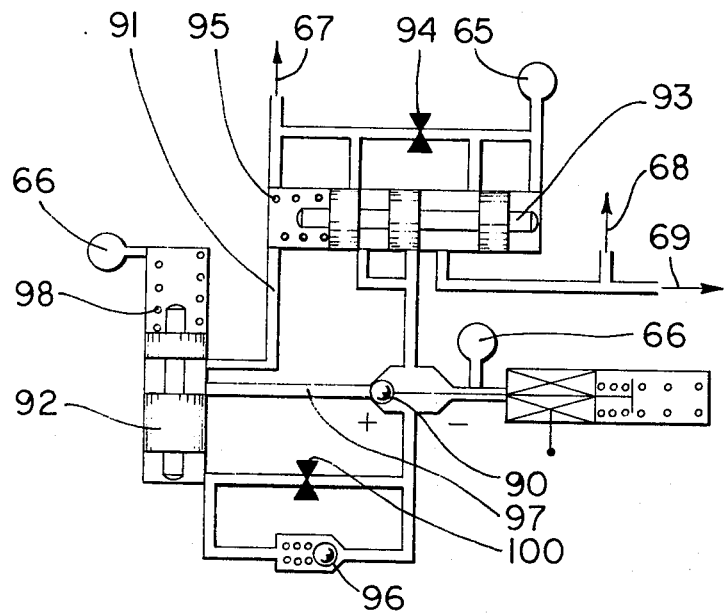

FIG. 7 shows a switching logic with an active solenoid valve in the drain and connected in parallel to the AND element. The active solenoid valve 90 has three switching states. In the unexcited state, it opens all connections to pressure medium drain 66. When positively excited, solenoid valve 90 blocks the connection between line 91 and pressure medium drain 66 through delay spool 98. In the case of negative excitation, solenoid valve 90 blocks all connections to pressure medium drain 66. When the servovalves are operating, solenoid valve 90 is positively excited, spool 98 is in the right-hand end position and connects outlets 67, 68 and 69 with pressure medium inlet 65. In order to describe the functioning of the switching logic in FIG. 7, initiation by means of the comparator as well as switching on and switching off by active solenoid valve 90 will now be considered.

a. Switching off by the comparator

When the comparator deflects, the pressure in line 67 breaks down and spool 98 is slid into the right-hand end position by the pressure medium entering at 65.

When the left-hand end position, spool 93 connects outlets 67, 68 and 69 with pressure medium drain 66, and functioning of the servovalves is irreversibly stopped due to connection with pressure medium drain 66. In this position, orifice 94 prevents a short circuit between pressure medium inlet and drain.

b. Switching off by the active solenoid valve

When the comparator does not deflect and energization of the active solenoid valve 90 is continuously blocked, line 67 is then connected to pressure medium drain 66 and spool 93 is pushed into the left-hand end position by the pressure existing at inlet 65. In this position, outlets 67, 68 and 69 are connected with pressure medium drain 66 and the servovalves are deactivated.

c. Switching on by the active solenoid valve

Switching off of the servovalves can be initiated by the comparator or by active solenoid valve 90. If deactivation is accomplished by the comparator, spool 93 remains in the left-hand end position until either the pressure medium flow at 65 is shut off from the outside, or, through brief negative excitation of solenoid valve 90, all connections to the pressure medium inlet 65 are temporarily blocked. When the pressure medium flow at 65 is shut off from the outside, spring 95 slides spool 93 into the right-hand end position again. When solenoid valve 90 is negatively excited, and all connections to pressure medium drain 66 are blocked, line 67 fills again through restrictor orifice 94, and the spool is slid into the right-hand end position. While solenoid valve 90 is closing all the connections to pressure medium drain 66 and line 67 is being filled, check valve 96 opens, and delay spool 92 is slid into the upper end position, thus blocking the connection between line 67 and solenoid valve 90.

If, following the brief negative excitation, solenoid valve 90 is again positively excited, the connection from line 67 through delay spool 92 remains blocked during the switching operation, until connection 97 is blocked, since the delay spool is still in the upper end position. Not until spring 98 has displaced the stroke volume of delay spool 92, via restrictor orifice 100, is the connection from line 67 to line 97 open again. The displacement volume of delay spool 92 and the flow through restrictor orifice 100 are coordinated with the switching time of the solenoid valve from negative to positive excitation.

When the servovalves are closed by active valve 90, functioning of the servovalves is, as in the case of deactivation by the comparator, restored by brief negative excitation of solenoid valve 90 and subsequent positive excitation.

Spool 93 can be brought into the right-hand end position by brief negative excitation of solenoid valve 90, only when the varying pressures at the servovalve outlets, which caused the deflection of the comparator, have again become uniform. Otherwise, line 67 does not fill through restrictor orifice 94.

Figure 8:
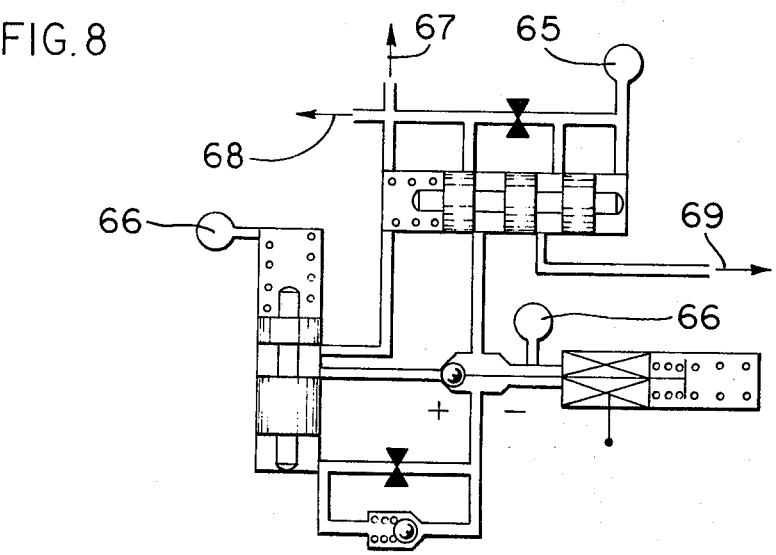

FIG. 8 shows a switching logic with an active solenoid valve in the drain and connected in parallel to the AND element. The circuit functions as in FIG. 7. However, outlet 68 to the AND-gate with the comparator is connected to the same space as line 67.

Figure 9:
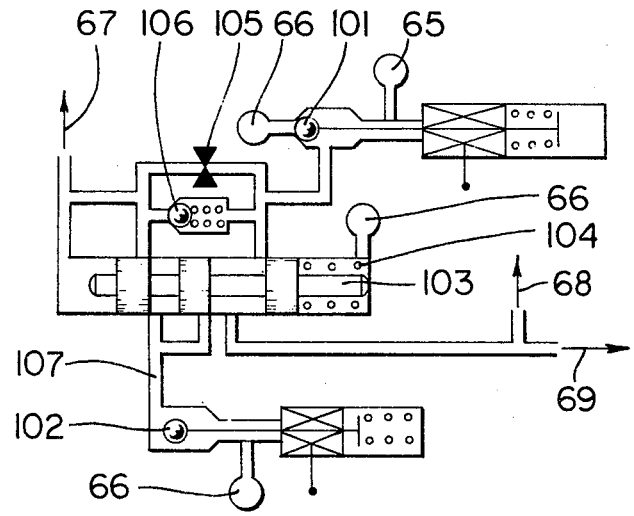

FIG. 9 shows a switching logic with an active solenoid valve in the inlet, a passive solenoid in the drain and parallel connection to the AND element. Active solenoid valve 101 has two switching states. In the energized state, it blocks the connection to pressure medium drain 66 and in the deenergized state, it blocks the connection to pressure medium inlet 65.

Passive solenoid valve 102 also has two switching states. In the unexcited state, it opens the connection to pressure medium drain 66 and in the excited state, it blocks this connection. When the servovalves are operating, active solenoid valve 101 is excited and passive solenoid valve 102 is unexcited. Spool 103 is in the right-hand end position and connects outlets 67, 68 and 69 with pressure medium inlet 65. In order to describe the functioning of the switching logic in FIG. 9, switching off by the comparator and by the active solenoid valve 101 as well as switching on by means of passive solenoid valve 102 will now be considered.

a. Switching off by the comparator

When the comparator deflects, the pressure in line 67 breaks down and spool 103 is moved into the left-hand end position by spring 104 in pressure medium drain 66. When in the left-hand end position, spool 103 connects outlets 67, 68 and 69 with pressure medium drain 66 and the servovalves are irreversibly stopped owing to the connection with pressure medium drain 66. Restrictor orifice 105 prevents the occurrence, in this position, of a short circuit between the pressure medium inlet and drain.

b. Switching off by the active solenoid valve

When the excitation of active solenoid valve 101 is stopped, it then blocks the connection to pressure medium inlet 65 and opens the connection to pressure medium drain 66. The pressure in line 67 breaks down and spring 104 slides spool 103 into the left-hand end position. At the beginning, the volume displaced by spool 103 is expelled through the opened check valve 106. In the left-hand end position, spool 103 connects outlets 67, 68 and 69 with pressure medium drain 66 and the servovalves are irreversibly stopped.

c. Switching on with the passive solenoid valve

Deactivation of servovalve functioning can be initiated by deflection of the comparator, by discontinuing excitation of the active solenoid valve 101, or stopping of the pressure medium flow at 65 from the outside. In all cases of deactivation, spool 103 is in the left-hand end position. In order to switch on, the active solenoid valve must first be excited and the connection to the pressure medium inlet 65 must open. Solenoid valve 102 is then briefly energized and line 107 to pressure medium drain 66 is blocked. During energization of solenoid valve 102, line 67 is filled through restrictor orifice 105 and spool 103 is pushed against spring 104 into the right-hand end position.

Spool 103 can be brought into the right-hand end position by brief excitation of solenoid valve 102, only when the varying pressures at the servovalve outlets, which caused the deflection of the comparator, have again become uniform. Otherwise, line 67 will not fill through restrictor orifice 105.

Figure 10:
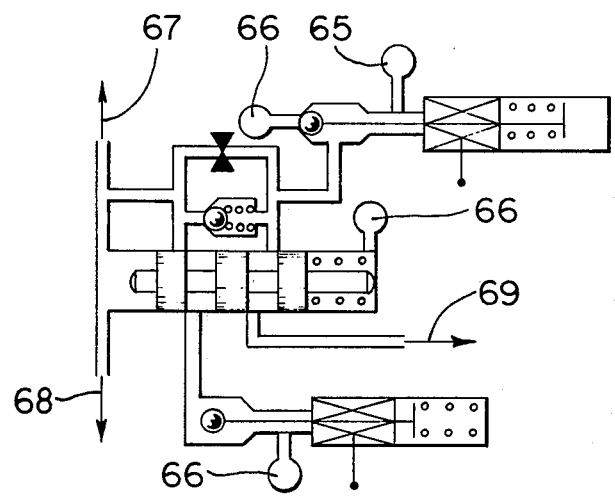

FIG. 10 shows a switching logic with an active solenoid valve in the inlet a passive solenoid valve in the drain and connected in parallel to the AND element.

The circuit shown in FIG. 10 functions as in FIG. 9. However, outlet 68 the AND-gate with the comparator is connected to the same space as line 67.

Figure 11:
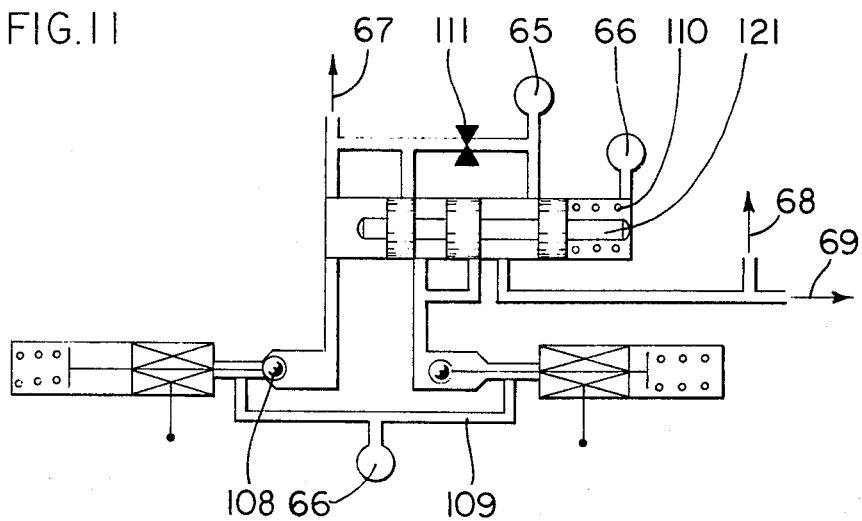

FIG. 11 shows a switching logic with an active and a passive solenoid valve in the drain and connected in series to the AND element.

Active solenoid valve 108 has two switching states. In the energized state, it blocks the connection to pressure medium drain 66 and in the de-energized state, it opens the connection to pressure medium drain 66. Passive solenoid valve 109 also has two switching states. In the de-energized state, it opens the connection to pressure medium drain 66 and in the energized state, it blocks this connection. When the servovalves are operating, active solenoid valve 108 is energized and passive solenoid valve 109 is de-energized.

Spool 121 is held in the left-hand end position by the pressure in line 67 and connects outlets 67, 68 and 69 with pressure medium inlet 65. To describe the functioning of the switching logic in FIG. 11, switching off by the comparator and by the active solenoid valve 108 as well as switching on by the passive solenoid valve 109 will now be considered.

a. Switching off by the comparator

When the comparator deflects, the pressure in line 67 breaks down and spool 121 is moved into the left-hand end position by spring 110. When spool 121 is in the left-hand end position, it connects outlets 67, 68 and 69 with pressure medium drain 66 and the servovalves are irreversibly stopped by the connection with pressure medium drain 66. In this position, restrictor orifice 111 prevents a short circuit between pressure medium inlet and drain.

b. Switching off by the active solenoid valve

When energization of the active solenoid valve 108 is discontinued, the connection from line 67 to pressure medium drain 66 is opened. The pressure in line 67 breaks down and spool 121 is slid into the left-hand end position by spring 110 in pressure medium drain 66. In the left-hand end position, spool 121 connects outlets 67, 68 and 69 with pressure medium drain 66 and the servovalves are irreversibly stopped.

c. Switching on with the passive solenoid valve

Deactivation of the servovalves can be initiated by deflection of the comparator, by discontinuing energization of the active solenoid valve 108 or by shutting off the pressure medium flow at 65 from the outside. In all cases, spool 121 is held in the left-hand end position by spring 110. In order to switch on after all types of deactivation, active solenoid valve 108 must first be energized and the connection to the pressure medium drain blocked. The passive solenoid valve is then briefly energized and blocks the connection to pressure medium drain 66.

During energization of passive solenoid valve 19, line 67 fills through restrictor orifice 111 and spool 121 is slid into the right-hand end position.

Spool 121 can be brought into the right-hand end position by brief energization of solenoid valve 109, only when the varying pressures at the servovalve outlets, which caused the deflection of the comparator, have again become uniform. Otherwise, line 67 will not fill through orifice 111.

Figure 12:
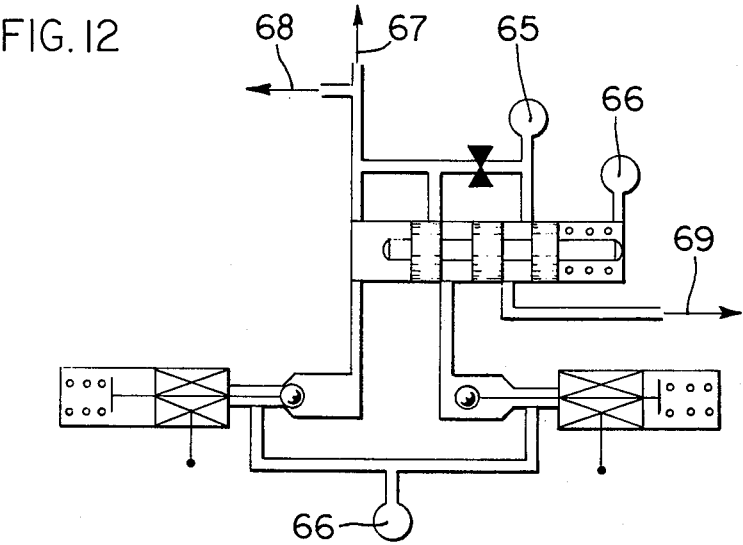

FIG. 12 shows a switching logic with an active and a passive solenoid valve in the drain and connected in parallel to the AND-gate.

The circuit in FIG. 12 functions the same as the one in FIG. 11. However, outlet 68 to the AND-gate with the comparator is connected to the same space as line 67.

Figure 13:
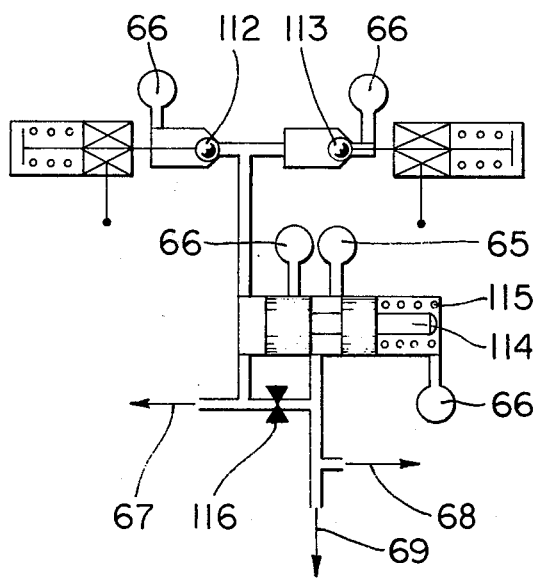

FIG. 13 shows a switching logic with an active solenoid valve in the drain and a passive solenoid valve in the inlet and connected to the AND-gate in series.

Active solenoid valve 112 has two switching states. In the energized state, it blocks the connection to pressure medium drain 66 and in the de-energized state, it opens the connection. Passive solenoid valve 113 also has two switching states. In the de-energized state it blocks the connection to the pressure medium inlet 65 and in the energized state, it reopens this connection. When the servovalves are operating, active solenoid valve 112 is de-energized. Spool 114 is held in the right-hand end position by the pressure in line 67 and connects outlets 67, 68 and 69 with pressure medium inlet 65. In order to describe the functioning of the switching logic in FIG. 13, switching off by the comparator and by the active solenoid valve 112 as well as switching on by the passive solenoid valve 113 will now be considered.

a. Switching off the comparator

When the comparator deflects, the pressure in line 67 breaks down and spool 114 is slid into the left-hand end position by spring 115 in pressure medium drain 66. In the left-hand end position, spool 114 connects outlet 67, 68 and 69 with pressure medium drain 66 and the servovalves are irreversibly stopped due to the connection with pressure medium drain 66. Restrictor orifice 116 prevents, during this operation, a short circuit between the pressure medium inlet and drain.

b. Switching off by the active solenoid valve

When energization of active solenoid valve 112 is discontinued, the connection to pressure medium drain 66 is opened and spring 115 slides spool 114 into the left-hand end position. In the left-hand end position, spool 114 connects outlets 67, 68 and 69 with pressure medium drain 66 and the servovalves are irreversibly stopped. Restrictor orifice 116 prevents, during this operation, a short circuit between the pressure medium inlet and drain.

c. Switching on by the positive solenoid valve

Deactivation of the servovalves can be initiated by deflection of the comparator, by discontinuing energization of active solenoid valve 112, or by stopping the flow of pressure medium at 65 from the outside. In all cases, the spool is held in the left-hand end position by spring 115. In order to switch on, following all types of deactivation, active solenoid 112 must first be energized and the connection to the pressure medium drain 66 blocked. The passive solenoid valve 113 is then energized briefly and opens to the pressure medium inlet 65, which causes the spool to slide into the right-hand end position against spring 115.

Spool 114 can be brought into the right-hand end position by brief energization of the passive solenoid valve, only when the varying pressures at the servovalve outlets, which caused the deflection of the comparator, have again become uniform.

Otherwise, line 67 will not fill through restrictor orifice 116.

Figure 14:
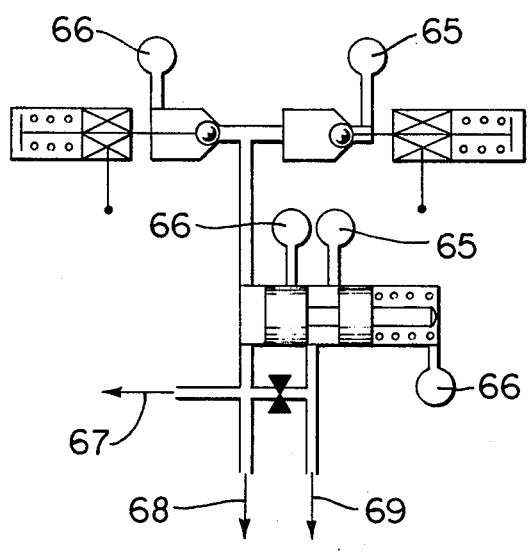

FIG. 14 shows a switching logic with an active solenoid valve in the drain and a passive solenoid valve in the inlet and connected in parallel to the AND-gate.

The circuit in FIG. 14 functions the same as the one in FIG. 13. However, line 68 to the AND-gate with the comparator is connected to the same space as line 67.

Figure 15:
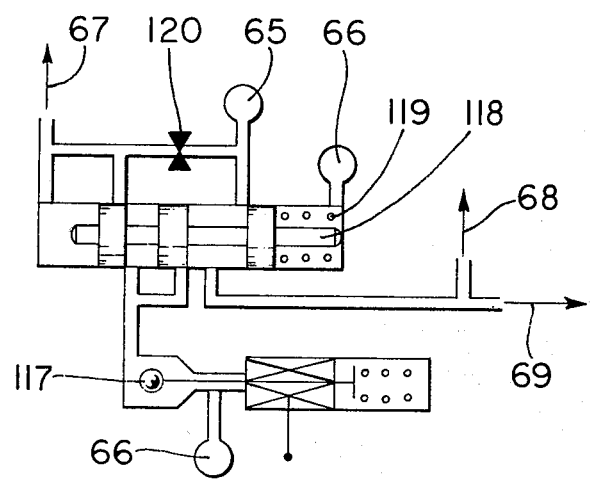

FIG. 15 shows a switching logic with a passive solenoid valve in the drain and connected in series to the AND element.

Passive solenoid valve 117 has two switching states. In the de-energized state, it opens the connection to pressure medium drain 66 and in the energized state, it blocks this connection. When the servovalves are operational, passive solenoid valve 117 is de-energized and spool 118 is in the right-hand end position and connects outlets 67, 68 and 69 with pressure medium inlet 65. In order to describe the functioning of the switching logic in FIG. 15, switching off by the comparator and switching on by the passive solenoid valve will now be considered. Switching off with the solenoid valve is not possible. If, in spite of error-free servovalves with uniform outlet pressures, switching off is to be effected, then the servovalves must receive artificial error signals that cause a pressure difference at the pressure outlets and thus, a deflection of the comparator.

a. Switching off by the comparator

When the comparator deflects, the pressure in line 67 breaks down and spool 118 is slid into the left-hand end position by spring 119 in pressure medium drain 66. In the left-hand end position, spool 118 connects outlets 67, 68 and 69 with pressure medium drain 66 and the servovalves are irreversibly stopped due to the connection with pressure medium drain 66. Restrictor orifice 120 prevents, in this position, a short circuit between the pressure medium inlet and drain.

b. Switching on with the passive solenoid valve

Deactivation of the servovalves can be initiated by deflection of the comparator or shutoff of the pressure medium flow at 65 from the outside. In both cases of deactivation, spool 118 is in the left-hand end position. For switching on, passive solenoid valve 117 is briefly energized, thus blocking the connection to pressure medium drain 66. During energization of passive solenoid valve 117, line 67 fills through restrictor orifice 120 and spool 118 is slid into the left-hand end position against spring 119.

Spool 118 can be brought into the right-hand end position by brief energization of passive solenoid valve 117, only when the varying pressures at the servovalve outlets, which caused the deflection of the comparator, have again become uniform. Otherwise, line 67 will not fill through restrictor orifice 120.

Figure 16:
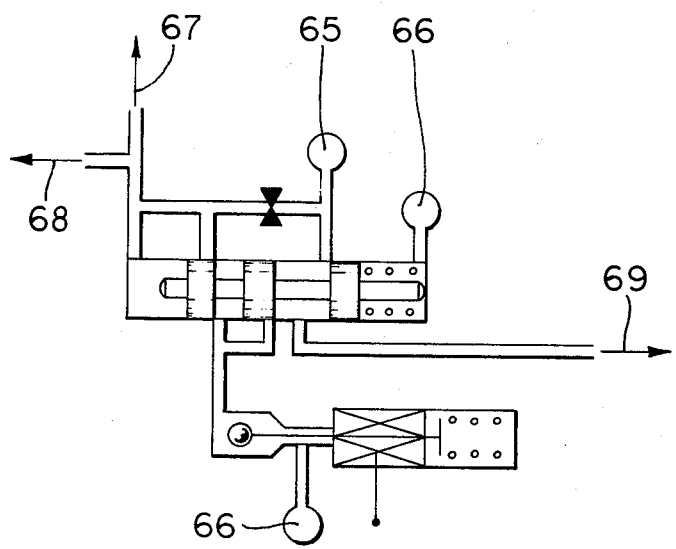

FIG. 16 shows a switching logic with a passive solenoid valve in the drain and connected in parallel to the AND-gate.

The circuit in FIG. 16 functions the same as the one in FIG. 15. However, the outlet 68 to the AND-gate with the comparator is connected to the same space as line 67.

FIG. 17 shows the redundant version of an AND-gate shown schematically as 42 in FIG. 2, wherein each of the lines 68 has a switching logic as in FIGS. 4 through 16. When at least one line 68 in each of the two AND-gates with spools 122 and 123 or 124 and 125 is connected to the pressure medium inlet via the switching logic, then all four spools 122, 123, 124 and 125 of the redundant AND-gate are in the left-hand end position. If, for example, only line 68 from spool 122 is connected to the pressure medium inlet, then the smaller spring 127 holds the separate spool 123 in the left-hand end position by bearing against spool 122.

When two lines 68 on one AND-gate, for example, with spools 122 and 123, are connected to the pressure medium drain via the associated switching logics, the larger spring 126 then moves spools 122 and 123 against the smaller spring 127 into the right-hand end position and thereby initiates a safety switch 128. While spools 122 and 123 are moving into the right-hand end position, the other AND-gate with spools 124 and 125 is also connected to the pressure medium drain through lines 132 and 131. The pressure coming from line 68 and existing in front of spools 124 and 125 is reduced by check valve 130, and spools 124 and 125 are moved into the right-hand end position, as is also true of spools 122 and 123, in order to trigger a safety switch 128. The switching logics in FIGS. 4 through 16 are designed so that, in case of a connection between pressure medium inlet and drain through line 131, a short circuit will not occur. It is the purpose of check valves 129 and 130 and lines 132 and 133 to prevent the connection of two switching logics through line 131 until one of the two AND-gates moves into the right-hand end position through connection of both lines 68 with the pressure medium drain. If, for example, only line 68 from spool 122 is connected with the pressure medium drain, then the connection to the pressure medium inlet if spool 124 and line 132 via check valve 129 remains blocked.

The embodiments of the invention in which an exclusive property or privilege is claimed are defined as follows:

1. A method for effecting an electrohydraulic control of a hydraulic actuator by means of a system employing a pair of servovalves, a control spool and a pressure comparator, comprising the steps of:
   producing a first pressure signal when said pair of servovalves are in a first condition and supplying said first pressure signal directly to one end of an elongated housing slideably supporting said control spool therein;
   producing a second pressure signal from a central pressure medium supply and supplying same to the opposite end of said elongated housing and effecting an application of force to one side of said control spool equal to the force applied to the opposite side of said control spool by said first pressure signal, a rendering of said forces unequal causing said control spool to move in said housing to effect a control of said hydraulic actuator;
   producing a pair of third pressure signals when at least one of said servovalves is moved to a second condition; and
   supplying each of said third pressure signals to spaced locations on a pressure comparator, issuing fourth pressure signal from the comparator, and operating an alarm means in response to said fourth pressure signal.

2. In combination with a hydraulic actuator, a device for effecting an electrohydraulic control of said hydraulic actuator, comprising:

servovalve circuit means including at least a pair of identical electrohydraulic servovalves each having an energized and an unenergized condition and each servovalve including at least a pair of output terminals thereon, each servovalve producing a first pressure signal at one of said pair of output terminals and a second pressure signal at the other one of said pair of output terminals dependent upon the condition thereof;
   means defining an elongated housing and a control spool slideably disposed therein for operating said actuator, and passageway means for connecting one end of said housing means to said one output terminal of each of said pair of servovalves so that said first pressure signals are applied to one face of said control spool;
   means defining a pressure source connected to the opposite end of said housing means, said pressure source means generating a third pressure signal to exert an equal and opposite force on an opposite face of said control spool relative to said first pressure signals, said control spool being movable in either direction if one of said first and third pressure signals is changed so that the force applied to opposite faces of said control spool are no longer equal to thereby effect a control of said hydraulic actuator;
   means defining a hydraulic logic system having a first pressure comparator means, said first pressure comparator means having a first outlet port means said first and second inlet ports which are each connected in fluid circuit with one end of said other of said output terminals of said pair of servovalves and said second pressure signal, said first pressure comparator means being responsive to a change in one of said second pressure signals from one of said pair of servovalves to produce a fourth pressure signal at said first outlet port means thereof;
   means defining an alarm responsive to a signal; and
   means in said hydraulic logic system responsive to said fourth pressure signal to generate said signal to effect an activation of said alarm means.

* * * * *

UNITED STATES PATENT AND TRADEMARK OFFICE
CERTIFICATE OF CORRECTION

PATENT NO. : 3,987,702
DATED : October 26, 1976
INVENTOR(S) : Holm Diethard Boss & Hans Albert Butschek It is certified that error appears in the above–identified patent and that said Letters Patent are hereby corrected as shown below:

In name of Assignee please change "Bolkow" to -- Bölkow ---.

Column 13, lines 37 & 39; change "issuing fourth" to

---issuing a fourth---.

Column 14, lines 30 & 31; change "means said first" to

---means and first---.

Column 14, line 32; change "with one end of said" to

---with one of said---.

Signed and Sealed this

Fifteenth Day of February 1977

[SEAL]

Attest:

RUTH C. MASON
Attesting Officer

C. MARSHALL DANN
Commissioner of Patents and Trademarks